(12) United States Patent
Wen (10) Patent No.: US 10,089,341 B2
(45) Date of Patent: Oct. 2, 2018

(54) MULTIDIMENSIONAL DATA STORAGE AND RETRIEVAL METHOD FOR MONITORING SYSTEM

(71) Applicant: BEIJING JINGDONG SHANGKE INFORMATION TECHNOLOGY CO, LTD., Haidian District, Beijing (CN)

(72) Inventor: Xing Wen, Beijing (CN)

(73) Assignee: BEIJING JINGDONG SHANGKE INFORMATION TECHNOLOGY CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/910,273

(22) PCT Filed: May 28, 2014

(86) PCT No.: PCT/CN2014/078641
§ 371 (c)(1),
(2) Date: Feb. 5, 2016

(87) PCT Pub. No.: WO2010/018224
PCT Pub. Date: Feb. 12, 2015

(65) Prior Publication Data
US 2016/0162523 A1 Jun. 9, 2016

(30) Foreign Application Priority Data
Aug. 7, 2013 (CN) .......................... 2013 1 0340860

(51) Int. Cl.
*G06F 17/30* (2006.01)
(52) U.S. Cl.
CPC .. *G06F 17/30321* (2013.01); *G06F 17/30569* (2013.01); *G06F 17/30592* (2013.01)

(58) Field of Classification Search
None
See application file for complete search history.

(56) References Cited

U.S. PATENT DOCUMENTS 5,218,700 A * 6/1993 Beechick .................. G06F 7/24
712/300
2002/0029207 A1* 3/2002 Bakalash .......... G06F 17/30457

FOREIGN PATENT DOCUMENTS

| CN | 1260546 | 7/2010 |
|----|---------|--------|
| CN | 103154943 | 6/2013 |
| CN | 103412916 | 11/2013 |

OTHER PUBLICATIONS

International Search Report for Application No. PCT/CN2014/078641 dated Aug. 8, 2014 (10 pages).

* cited by examiner

*Primary Examiner* — Ashish Thomas
*Assistant Examiner* — Mellissa M. Ohba
(74) *Attorney, Agent, or Firm* — Michael Best & Friedrich LLP (57) ABSTRACT

The storage method comprises: acquiring a plurality of monitoring dimensionalities associated with each monitoring service and at least one pair of monitoring indicator data including an indicator name and an indicator value; converting the plurality of monitoring dimensionalities into a plurality of row keyword mapping values having the same length, respectively; combining monitoring time with the plurality of row keyword mapping values to form a row keyword, and setting the monitoring time in a fixed time position in the row keyword; and using the row keyword as an index to store a monitoring indicator in a distributed database. A dynamic adjustment of monitoring dimensionalities of data storage for the monitoring system is achieved (Continued)

in accordance with different monitoring services, thereby reducing maintenance costs and improving scalability.

14 Claims, 4 Drawing Sheets

MULTIDIMENSIONAL DATA STORAGE AND RETRIEVAL METHOD FOR MONITORING SYSTEM

TECHNICAL FIELD

The invention relates to a technical field relating to data monitoring, and in particular to a multidimensional data storage and retrieval method and device for a monitoring system.

BACKGROUND ART

Storage and exhibition of monitoring data are always keys of a monitoring system, the higher frequency for performing data collection with respect to a system to be monitored is, the larger an amount of the collected data is. Along with an increase of a collecting time, a problem of a slow storage of data and a slow retrieval of data will be resulted in. If the frequency for performing the collection is too low, the amount of the collected data is reduced, but it goes against an effective monitoring of a real-time health status of the system, and with respect to an important IT system (a system that cannot be interrupted for 7*24 hours), an importance of a background monitoring is self-evident, so there's a high demand for a reliable scheme design for the storage and retrieval (for a report presentation, historical statistics, and comparison) of the monitoring data.

With respect to the storage and retrieval of the monitoring data, the existing technical solution generally uses a common database for storage, and generally adopts the following method:
(1) Performing the storage and retrieval by an SQL database: the SQL database is mainly composed of a data storage module, a data query module and an expired data deleting module.
A. The data storage module: an asynchronous batch storage is adopted at a background to improve a data storage speed.
B. The data query module: a standard sql is adopted to perform a data query.
C. The expired data deleting module: it is inevitable to delete data before a time point, e.g., data before one month, in order to avoid a slow query speed due to too large amount of the data.

However, monitoring dimensionalities of the monitoring in the prior art will be generally limited by a designed table structure (the table structure is designed in accordance with services), and the newly added monitoring data generally can be only achieved by modifying a program code, which increases maintenance costs and limits expandability.

SUMMARY OF THE INVENTION

In view of this, it is necessary to propose a multidimensional data storage and retrieval method and device for a monitoring system with respect to a technical problem that monitoring dimensionalities of data storage for the existing monitoring system are fixed, and cannot be dynamically adjusted in accordance with different monitoring services.

A multidimensional data storage method for a monitoring system, comprises:
acquiring a plurality of monitoring dimensionalities associated with each monitoring service and at least one pair of monitoring indicator data including an indicator name and an indicator value;
converting the plurality of monitoring dimensionalities into a plurality of row keyword mapping values having the same length, respectively;
combining monitoring time with the plurality of row keyword mapping values to form a row keyword, and setting the monitoring time in a fixed time position in the row keyword;
using the row keyword as an index to store monitoring indicators in a distributed database.

A multidimensional data storage device for a monitoring system, comprises:
an indicator acquiring module for acquiring a plurality of monitoring dimensionalities associated with each monitoring service and at least one pair of monitoring indicator data including an indicator name and an indicator value;
a mapping value acquiring module for converting the plurality of monitoring dimensionalities into a plurality of row keyword mapping values having the same length, respectively;
a row keyword generating module for combining monitoring time with the plurality of row keyword mapping values to form a row keyword, and setting the monitoring time in a fixed time position in the row keyword; and
a storage module for using the row keyword as an index to store a monitoring indicator in a distributed database.

A multidimensional data retrieval method for a monitoring system, comprises:
converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;
retrieving a row keyword satisfying the retrieval request, the row keyword including a plurality of row keyword mapping values having the same length and monitoring time set in a fixed time position in the row keyword, the row keyword satisfying the retrieval request specifically comprising:
the monitoring time split out from the fixed time position in the row keyword, the monitoring time that is split out being within the time range to be retrieved, and
the plurality of row keyword mapping values split out from the row keyword, the row keyword that is split out including the plurality of mapping values to be retrieved; and acquiring at least one pair of monitoring indicator data including an indicator name and an indicator value stored by using the row keyword satisfying the retrieval request as an index.

A multidimensional data retrieval device for a monitoring system, comprises:
a retrieval request responding module for converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;
a row keyword retrieving module for retrieving a row keyword satisfying the retrieval request, the row keyword including a plurality of row keyword mapping values having the same length and monitoring time set in a fixed time position in the row keyword, the row keyword satisfying the retrieval request specifically comprising:
the monitoring time split out from the fixed time position in the row keyword, the monitoring time that is split out being within the time range to be retrieved, and the plurality of row keyword mapping values split out from the row keyword, the row keyword that is split out including the plurality of mapping values to be retrieved; and
an indicator data acquiring module for acquiring at least one pair of monitoring indicator data including an indicator name and an indicator value stored by using the row keyword satisfying the retrieval request as an index.

A multidimensional data storage and retrieval method and device for a monitoring system of the invention convert the monitoring dimensionalities into the mapping values having a fixed length, combine the monitoring time with the plurality of row keyword mapping values to form the row keyword, and set the monitoring time in the fixed time position in the row keyword. Since the row keyword mapping values have a fixed length, and the position of the monitoring time in the row keyword is also fixed, no matter how many monitoring dimensionalities the monitoring services have, the corresponding row keyword can be formed, and the row keyword can be very easily split during the retrieval to obtain the row keyword mapping values of the monitoring dimensionalities and the monitoring time to thereby achieve dynamic modification of the monitoring dimensionalities. By using the row keyword as the index to store the monitoring indicator in the distributed database, a dynamic adjustment of monitoring dimensionalities of data storage for the monitoring system can be achieved in accordance with different monitoring services, so as to solve the technical problem in the prior art that modification of the monitoring dimensionality can be only realized by modifying a program code, thereby reducing maintenance costs and improving expandability.

DETAILED DESCRIPTION

The contents below give further detailed descriptions of the invention by taking the figures and embodiments into consideration.

Figure 1:
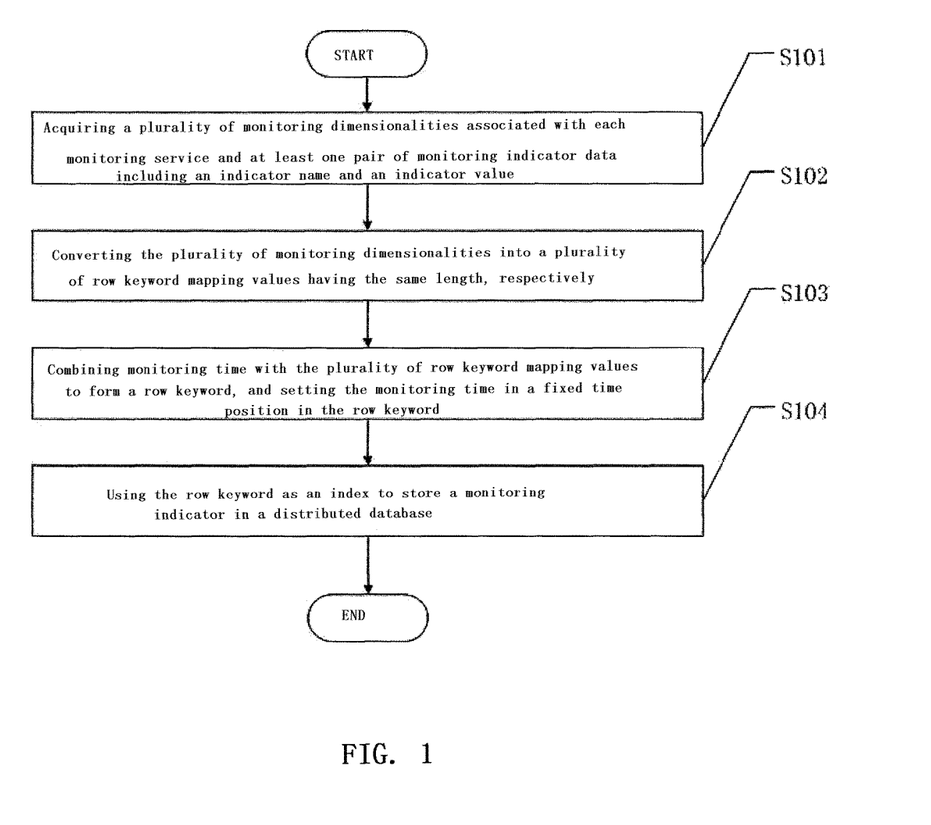
FIG. 1 is a work flow chart of a multidimensional data storage method for a monitoring system of the invention.

FIG. 1 is a work flow chart of a multidimensional data storage method for a monitoring system of the invention, comprising:

Step S101: acquiring a plurality of monitoring dimensionalities associated with each monitoring service and at least one pair of monitoring indicator data including an indicator name and an indicator value;

Step S102: converting the plurality of monitoring dimensionalities into a plurality of row keyword mapping values having the same length, respectively;

Step S103: combining monitoring time with the plurality of row keyword mapping values to form a row keyword, and setting the monitoring time in a fixed time position in the row keyword; and Step S104: using the row keyword as an index to store a monitoring indicator in a distributed database.

The monitoring dimensionalities are used for identifying the monitoring indicator, and a very meticulous division and aggregation can be performed with respect to the indicator data by means of the monitoring dimensionalities. For example, a CPU usage rate, a memory usage rate and a hard disk usage rate of a computer HOST-001 on Layer C, Building B, District A in Beijing are monitored, the monitoring dimensionalities include: monitoring dimensionality 1: Beijing, monitoring dimensionality 2: District A, monitoring dimensionality 3: Building B, monitoring dimensionality 4: Layer C, and monitoring dimensionality 5: HOST-001. By dividing the monitoring dimensionalities, the various indicator data having the same monitoring dimensionality can be aggregated and classified.

The existing monitoring system is required to firstly design a table structure, i.e., determining a row keyword and a column keyword, before carrying out the monitoring. However, in the monitoring system, it is required to adopt different monitoring dimensionalities with respect to different monitoring services, but the existing monitoring system can only predetermine the monitoring dimensionality of each monitoring service before carrying out the monitoring, and cannot modify the monitoring dimensionality during the monitoring process.

The embodiment of the invention adopts a manner of dynamically modifying the monitoring dimensionalities. In the process of carrying out the monitoring, the monitoring dimensionalities, including a name and the number of the monitoring dimensionalities, of the current monitoring service are acquired by the step S101, and then in the step S103, the plurality of monitoring dimensionalities are combined with the monitoring time to form the row keyword, which is used as the index to store the corresponding monitoring indicator. In the step S102, the monitoring dimensionalities are converted into the row keyword mapping values having the same length, and meanwhile, in the step S103, the monitoring time is set in the fixed time position in the row keyword, so during the retrieval, the monitoring time can be split out in accordance with the fixed time position, and the row keyword mapping values of the plurality of monitoring dimensionalities can be also split out in accordance with the fixed length, so as to achieve the combination of the plurality of monitoring dimensionalities with the monitoring time to form the row keyword, and using the row keyword that has undergone the combination as a storage index of the indicator data. If the monitoring time is not set by adopting the fixed time position, and the row keyword mapping values of the monitoring dimensionalities are not set by adopting the fixed length either, the plurality of monitoring dimensionalities and the monitoring time cannot be newly split out after the plurality of monitoring dimensionalities are combined with the monitoring time, so that it cannot be achieved to use the row keyword formed by combining the plurality of monitoring dimensionalities with the monitoring time as the storage index of the indicator data.

Each dimensionality is identified as an identifier of one character string, the row keyword mapping values can be converted in multiple manners. In one of the embodiments, the row keyword mapping value is a Hash value of the monitoring dimensionality. The length can be reduced by adopting the Hash value, so as to save a storage space. After the row keyword mapping value adopts the Hash value, the row keyword mapping value of each monitoring dimensionality occupies a length of 4 bytes, i.e., an integer (int) occupied length.

The time position can be set in an arbitrary place of the row keyword, e.g., set behind the first row keyword mapping value, or in front of the last row keyword mapping value. In one of the embodiments, the time position is a header or a tail of the row keyword. Since in the monitoring system, the format of monitoring time is fixed, the data length thereof is also fixed, so if the time position is set the header or the tail of the row keyword, the data having a fixed length can be easily cut out from the header or the tail of the row keyword to serve as the monitoring time.

Figure 2:
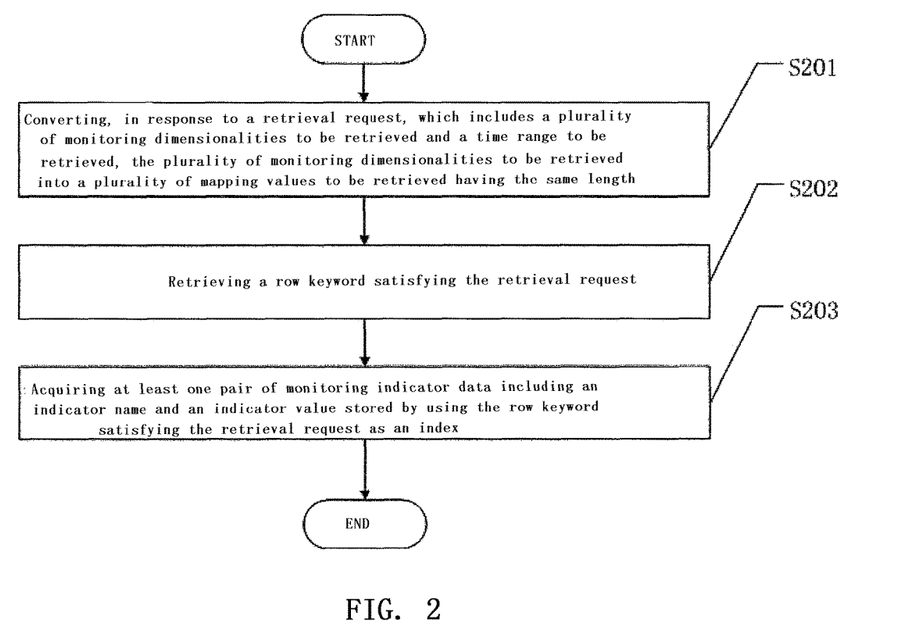
FIG. 2 is a work flow chart of a multidimensional data retrieval method for a monitoring system of the invention.

FIG. 2 is a work flow chart of a multidimensional data retrieval method for a monitoring system of the invention, comprising:

Step S201: converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;

Step S202: retrieving a row keyword satisfying the retrieval request, the row keyword including a plurality of row keyword mapping values having the same length and monitoring time set in a fixed time position in the row keyword, the row keyword satisfying the retrieval request specifically comprising:

the monitoring time split out from the fixed time position in the row keyword, the monitoring time that is split out being within the time range to be retrieved, and the plurality of row keyword mapping values split out from the row keyword, the row keyword that is split out including the plurality of mapping values to be retrieved; and Step S203: acquiring at least one pair of monitoring indicator data including an indicator name and an indicator value stored by using the row keyword satisfying the retrieval request as an index.

In one of the embodiments, the step S202 specifically comprises:

splitting out the monitoring time from the fixed time position with respect to each row keyword, and splitting out the plurality of row keyword mapping values having the same length from the row keyword, from which the monitoring time has been split out, in accordance with the same length; and determining that the row keyword satisfies the retrieval request if it is retrieved that the monitoring time that is split out is within the time range to be retrieved, and the plurality of row keyword mapping values that are split out include the plurality of mapping values to be retrieved.

In one of the embodiments, the mapping value to be retrieved is a Hash value of the monitoring dimensionality to be retrieved.

In one of the embodiments, the monitoring time is set at a header or a tail of the row keyword.

Figure 3:
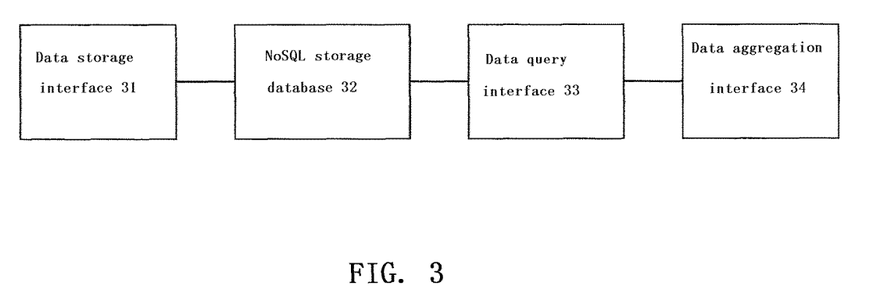
FIG. 3 is a module structure block of an example of the invention.

FIG. 3 is a module structure block of an example of the invention, comprising:

a data storage interface 31, an NoSQL storage database 32, a data query interface 33 and a data aggregation interface 34, wherein the data storage interfaced 31 adopts a multidimensional data storage method for a monitoring system of the embodiment of the invention to store the monitoring data in the NoSQL storage database 32, and the NoSQL storage database 32 performs the storage by adopting hbase storage based on an Hadoop file system; the data query interface 33 adopts a multidimensional data retrieval method for a monitoring system of the embodiment of the invention to perform the retrieval with respect to the monitoring data stored in the NoSQL storage database 32; the aggregation interface 34 acquires the desired monitoring data through the data query interface 33, achieves a data aggregation and calculation of minutes, hours, days, weeks under different monitoring dimensionalities in accordance with the monitoring dimensionalities of the monitoring data to obtain statistical values such as an average value, a maximum value and a minimum value so as to store in the NoSQL storage database 32; and specific demands for the monitoring dimensionalities are deigned and provided by the monitoring system according to requirements, and the aggregation interface 34 is called by means of a timing task to obtain the corresponding data.

As an example, the row keyword is combined as shown in Table 1.

| Row keyword mapping value 1 (4 bytes) | Row keyword mapping value 2 (4 bytes) | Row keyword mapping value 3 (4 bytes) | Row keyword mapping value N . . . | Monitoring time (8 bytes) |
|---|---|---|---|---|

Table 1 is an example of a row keyword combination, where each row keyword mapping value is 4 bytes (i.e., integer data), and the monitoring time adopts 8 bytes.

Table 2 shows indicator data that are correspondingly stored.

| Column family of monitoring indicator data | | | |
|---|---|---|---|
| Indicator name 1 | Indicator name 2 | Indicator name 3 | Indicator name N . . . |
| Indicator value (value 8 bytes) | Indicator value | Indicator value | Indicator value |

Table 2 is an example of indicator data storage, where the indicator data include an indicator name and an indicator value, and the indicator value can be stored by adopting a double byte (occupying 8 bytes) to thereby reduce a space occupied by the storage.

The adoption of the above design can effectively reduce a storage space occupied by a storage of massive data, and can effectively improve a query speed, and the monitoring dimensionalities and the monitoring indicator can be dynamically expanded to adapt to a service change.

Meanwhile, the existing monitoring system stores the data in a relational database, so:

1. A storage speed is in a direct proportion to the magnitude of the amount of the data, and the storage speed will get slow along with the rise of the amount of the data (the time range, e.g., one month, one week, of the saved monitoring data should be carefully analyzed).

2. A retrieval speed is in a direct proportion to the magnitude of the amount of the data, and is associated with a concurrency level of the retrieval, and the larger the amount of the data is, and the more persons who perform the retrieval at the same time are, the slower the retrieval speed is.

3. A storage capacity is limited, since a large storage capacity of a common relational database will influence the query speed, expired data will be generally deleted at regular times, and only data within a fixed range are saved, which also results in that historical data cannot be tracked very well to perform a statistical comparison.

The embodiment of the invention stores the indicator data in a distributed database, so the distributed database can be sufficiently utilized to perform a data expansion, e.g., the storage can be performed by adopting the hbase storage based on the Hadoop file system to thereby solve the problem of the storage and retrieval of the massive data, and a data storage interval (based on the time range) can be set to automatically clear the expired data. With respect to the storage and query of the data, an interface design and realization can be performed by sufficiently utilizing distribution characteristics of the hbase, and storage and retrieval efficiencies of the massive data can be laterally expanded by adding storage hardware, which will not reduce the storage and retrieval speeds.

Figure 4:
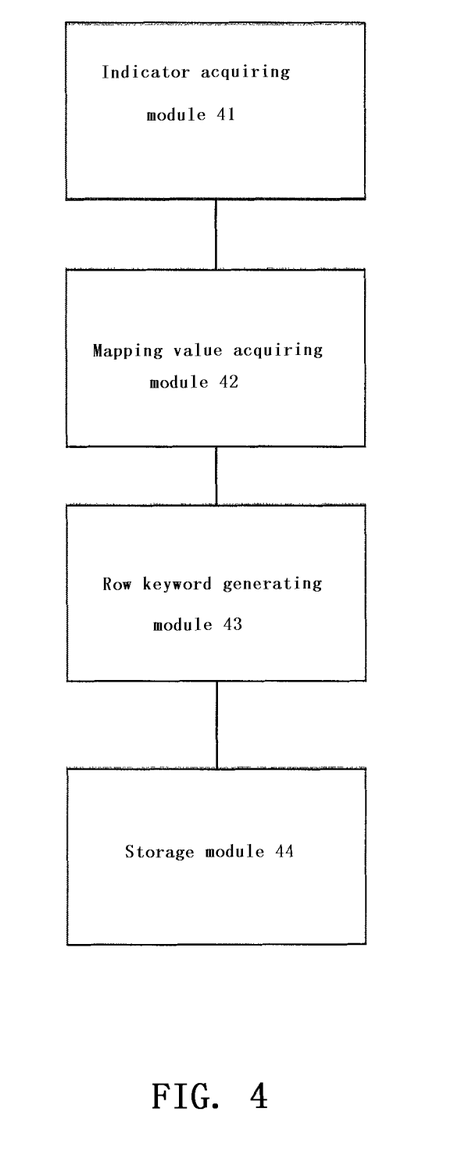
FIG. 4 is a module structure block of a multidimensional data storage device for a monitoring system of the invention.

FIG. 4 is a module structure block of a multidimensional data storage device for a monitoring system of the invention, comprising:

an indicator acquiring module 41 for acquiring a plurality of monitoring dimensionalities associated with each monitoring service and at least one pair of monitoring indicator data including an indicator name and an indicator value;

a mapping value acquiring module 42 for converting the plurality of monitoring dimensionalities into a plurality of row keyword mapping values having the same length, respectively;

a row keyword generating module 43 for combining monitoring time with the plurality of row keyword mapping values to form a row keyword, and setting the monitoring time in a fixed time position in the row keyword; and a storage module 44 for using the row keyword as an index to store a monitoring indicator in a distributed database.

In one of the embodiments, the row keyword mapping value is a Hash value of the monitoring dimensionality.

In one of the embodiments, the time position is a header or a tail of the row keyword.

Figure 5:
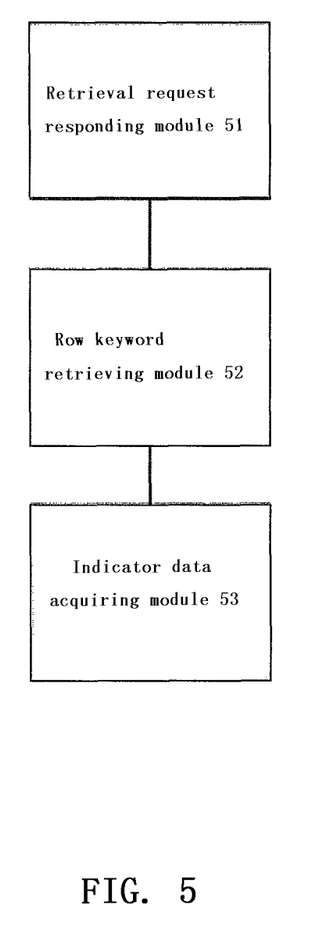
FIG. 5 is a module structure block of a multidimensional data retrieval device for a monitoring system of the invention.

FIG. 5 is a module structure block of a multidimensional data retrieval device for a monitoring system of the invention, comprising:

a retrieval request responding module 51 for converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;

a row keyword retrieving module 52 for retrieving a row keyword satisfying the retrieval request, the row keyword including a plurality of row keyword mapping values having the same length and monitoring time set in a fixed time position in the row keyword, the row keyword satisfying the retrieval request specifically comprising:

the monitoring time split out from the fixed time position in the row keyword, the monitoring time that is split out being within the time range to be retrieved, and the plurality of row keyword mapping values split out from the row keyword, the row keyword that is split out including the plurality of mapping values to be retrieved; and an indicator data acquiring module 53 for acquiring at least one pair of monitoring indicator data including an indicator name and an indicator value stored by using the row keyword satisfying the retrieval request as an index.

In one of the embodiments, the row keyword retrieving module 52 is specifically used for:

splitting out the monitoring time from the fixed time position with respect to each row keyword, and splitting out the plurality of row keyword mapping values having the same length from the row keyword, from which the monitoring time has been split out, in accordance with the same length; and if it is retrieved that the monitoring time that is split out is within the time range to be retrieved, and the plurality of row keyword mapping values that are split out include the plurality of mapping values to be retrieved, the row keyword satisfies the retrieval request.

In one of the embodiments, the mapping value to be retrieved is a Hash value of the monitoring dimensionality to be retrieved.

In one of the embodiments, the monitoring time is set at a header or a tail of the row keyword.

The embodiments mentioned above only express several implementation modes of the invention, and descriptions thereof are comparatively specific and detailed, but they cannot be accordingly understood as limitations of the scope of the patent for invention. It should be noted that those skilled in the art can further make some transformations and improvements on the premise of not departing from the concept of the invention, and these transformations and improvements all fall within the scope of protection of the invention. Thus, the scope of protection of the patent for invention should be based on the enclosed claims.

The invention claimed is:

1. A multidimensional data storage method for a monitoring system, characterized by comprising:

in a process of carrying out monitoring, acquiring a plurality of monitoring dimensionalities associated with each monitoring service and at least one pair of monitoring indicator data including an indicator name and an indicator value;

converting the plurality of monitoring dimensionalities into a plurality of row keyword mapping values having the same length, respectively;

combining monitoring time with the plurality of row keyword mapping values to form a concatenated row keyword, and setting the monitoring time in a fixed time position in the row keyword, the fixed time position being at least one selected from a group consisting of within the concatenated row keyword before a first row keyword mapping value included in the concatenated row keyword, within the concatenated row keyword after a last row keyword mapping value included in the concatenated row keyword, and within the concatenated row keyword between two row keyword mapping values included in the concatenated row keyword; and using the concatenated row keyword as an index to store a monitoring indicator in a distributed database.

2. The multidimensional data storage method for a monitoring system according to claim 1, characterized in that the row keyword mapping value is a Hash value of the monitoring dimensionality.

3. The multidimensional data storage method for a monitoring system according to claim 1, characterized in that the time position is a header or a tail of the concatenated row keyword.

4. Non-transitory computer readable medium storing instructions for perform a set of functions, the set of functions comprising:

acquiring a plurality of monitoring dimensionalities associated with each monitoring service and at least one pair of monitoring indicator data including an indicator name and an indicator value in a process of carrying out monitoring;

converting the plurality of monitoring dimensionalities into a plurality of row keyword mapping values having the same length, respectively;

combining monitoring time with the plurality of row keyword mapping values to form a concatenated row keyword, and setting the monitoring time in a fixed time position in the row keyword, the fixed time position being at least one selected from a group consisting of within the concatenated row keyword before a first row keyword mapping value included in the concatenated row keyword, within the concatenated row keyword after a last row keyword mapping value included in the concatenated row keyword, and within the concatenated row keyword between two row keyword mapping values included in the concatenated row keyword; and using the concatenated row keyword as an indicator to store a monitoring indicator in a distributed database.

5. The medium according to claim 4, characterized in that the row keyword mapping value is a Hash value of the monitoring dimensionality.

6. The medium according to claim 4, characterized in that the time position is a header or a tail of the concatenated row keyword.

7. A multidimensional data retrieval method for a monitoring system, characterized by comprising:

converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;

retrieving a concatenated row keyword satisfying the retrieval request, the concatenated row keyword including a plurality of row keyword mapping values having the same length and monitoring time set in a fixed time position in the row keyword, the fixed time position being at least one selected from a group consisting of within the concatenated row keyword before a first row keyword mapping value included in the concatenated row keyword, within the concatenated row keyword after a last row keyword mapping value included in the concatenated row keyword, and within the concatenated row keyword between two row keyword mapping values included in the concatenated row keyword, the concatenated row keyword satisfying the retrieval request specifically comprising:

the monitoring time split out from the fixed time position in the concatenated row keyword, the monitoring time that is split out being within the time range to be retrieved, and the plurality of row keyword mapping values split out from the concatenated row keyword, the concatenated row keyword that is split out including the plurality of mapping values to be retrieved; and acquiring at least one pair of monitoring indicator data including an indicator name and an indicator value stored by using the concatenated row keyword satisfying the retrieval request as an index.

8. The multidimensional data retrieval method for a monitoring system according to claim 7, characterized in that the step of retrieving the concatenated row keyword satisfying the retrieval request specifically comprises:

splitting out the monitoring time from the fixed time position with respect to each concatenated row keyword, and splitting out the plurality of row keyword mapping values having the same length from the row keyword, from which the monitoring time has been split out, in accordance with the same length; and if it is retrieved that the monitoring time that is split out is within the time range to be retrieved, and the plurality of row keyword mapping values that are split out include the plurality of mapping values to be retrieved, the concatenated row keyword satisfies the retrieval request.

9. The multidimensional data retrieval method for a monitoring system according to claim 7, characterized in that the mapping value to be retrieved is a Hash value of the monitoring dimensionality to be retrieved.

10. The multidimensional data retrieval method for a monitoring system according to claim 7, characterized in that the monitoring time is set at a header or a tail of the concatenated row keyword.

11. Non-transitory computer-readable medium storing instructions for performing a set of functions, the set of functions comprising:

converting, in response to a retrieval request, which includes a plurality of monitoring dimensionalities to be retrieved and a time range to be retrieved, the plurality of monitoring dimensionalities to be retrieved into a plurality of mapping values to be retrieved having the same length;

retrieving a concatenated row keyword satisfying the retrieval request, the concatenated row keyword including a plurality of row keyword mapping values having the same length and monitoring time set in a fixed time position in the row keyword, the fixed time position being at least one selected from a group consisting of within the concatenated row keyword before a first row keyword mapping value included in the concatenated row keyword, within the concatenated row keyword after a last row keyword mapping value included in the concatenated row keyword, and within the concatenated row keyword between two row keyword mapping values included in the concatenated row keyword, the concatenated row keyword satisfying the retrieval request specifically comprising:

the monitoring time split out from the fixed time position in the concatenated row keyword, the monitoring time that is split out being within the time range to be retrieved, and the plurality of row keyword mapping values split out from the concatenated row keyword, the row keyword that is split out including the plurality of mapping values to be retrieved; and acquiring at least one pair of monitoring indicator data including an indicator name and an indicator value stored by using the concatenated row keyword satisfying the retrieval request as an index.

12. The medium according to claim 11, characterized in that retrieving the concatenated row keyword includes:

splitting out the monitoring time from the fixed time position with respect to each concatenated row keyword, and splitting out the plurality of row keyword mapping values having the same length from the row keyword, from which the monitoring time has been split out, in accordance with the same length; and if it is retrieved that the monitoring time that is split out is within the time range to be retrieved, and the plurality of row keyword mapping values that are split out include the plurality of mapping values to be retrieved, the concatenated row keyword satisfies the retrieval request.

13. The medium according to claim 11, characterized in that the mapping value to be retrieved is a Hash value of the monitoring dimensionality to be retrieved.

14. The medium according to claim 11, characterized in that the monitoring time is set at a header or a tail of the concatenated row keyword.

* * * * *